US012746795B2

(12) United States Patent
Jeong et al.

(10) Patent No.: US 12,746,795 B2
(45) Date of Patent: Sep. 29, 2026

(54) HEAT PUMP SYSTEM FOR VEHICLE

(71) Applicants: Hyundai Motor Company, Seoul (KR); Kia Corporation, Seoul (KR)

(72) Inventors: Seong-Bin Jeong, Hwaseong-si (KR); Jae-Eun Jeong, Hwaseong-si (KR); Yong Woong Cha, Yongin-si (KR); Wan Je Cho, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 293 days.

(21) Appl. No.: 18/325,247

(22) Filed: May 30, 2023

(65) Prior Publication Data

US 2024/0190202 A1 Jun. 13, 2024

(30) Foreign Application Priority Data

Dec. 12, 2022 (KR) ........................ 10-2022-0172991

(51) Int. Cl.
*B60H 1/00* (2006.01)
*B60H 1/14* (2006.01)

(52) U.S. Cl.
CPC ..... *B60H 1/00278* (2013.01); *B60H 1/00385* (2013.01); *B60H 1/00914* (2013.01); *B60H 1/143* (2013.01); *B60H 2001/00307* (2013.01); *B60H 2001/00928* (2013.01); *B60H 2001/00935* (2013.01)

(58) Field of Classification Search
CPC ............ B60H 1/00278; B60H 1/00385; B60H 1/00392; B60H 1/004; B60H 1/00485; B60H 1/00885; B60H 1/00914; B60H 1/143; B60H 1/2221; B60H 1/3227; B60H 1/32284; B60H 2001/00307; B60H 2001/00928; B60H 2001/00935; B60L 58/26; B60L 58/27; B60Y 2200/90
See application file for complete search history.

(56) References Cited

U.S. PATENT DOCUMENTS

2021/0379960 A1* 12/2021 Kim .................. B60H 1/32284

FOREIGN PATENT DOCUMENTS

KR 20210047733 A * 4/2021 ......... B60H 1/00385

OTHER PUBLICATIONS

Lee et al., Integrated Thermal Management Circuit for Vehicle, Apr. 30, 2021, KR 20210047733 A, Whole Document (Year: 2021).*

* cited by examiner

*Primary Examiner* — Elizabeth J Martin
*Assistant Examiner* — Adam Dorrel Moore
(74) *Attorney, Agent, or Firm* — Slater Matsil, LLP

(57) ABSTRACT

An embodiment heat pump system for a vehicle includes a valve module for controlling a flow of a coolant according to a selected mode for temperature adjustment of a vehicle interior and temperature adjustment of a battery module, a first line connected to the valve module, an electrical component on the first line, a second line connected to the first line and the valve module, a radiator on the second line, a third line connected to the valve module, wherein the battery module is on the third line, a fourth line connected to the valve module and the third line, a fifth line connected to the valve module, a chiller on the fifth line, a sixth line connected to the first line and the fifth line, and a seventh line connected to the third line and the fifth line.

20 Claims, 4 Drawing Sheets

HEAT PUMP SYSTEM FOR VEHICLE

CROSS-REFERENCE TO RELATED APPLICATIONS

This application claims the benefit of Korean Patent Application No. 10-2022-0172991, filed on Dec. 12, 2022, which application is hereby incorporated herein by reference.

TECHNICAL FIELD

The present disclosure relates to a heat pump system for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

In the electric vehicle or the hybrid vehicle among these environmentally friendly vehicles, a separate heater is not used unlike an air conditioner of a general vehicle, and an air conditioner used in the environmentally friendly vehicle is generally called a heat pump system.

Meanwhile, the electric vehicle having the power source of a fuel cell generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling means, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connection pipes are employed, and thus noise and vibration due to frequent opening and closing operations of the valves may be introduced into the vehicle interior, thereby deteriorating the ride comfort.

In addition, when heating the vehicle interior, the heating performance may be deteriorated due to the lack of a heat source, the electricity consumption may be increased due to the usage of the electric heater, and the power consumption of the compressor may be increased.

In addition, a separate heat-exchanger is additionally required in order to recollect waste heat from various heat sources in the heating mode of the vehicle, which results in the disadvantage of increasing manufacturing costs.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a heat pump system for a vehicle. Particular embodiments relate to a heat pump system for a vehicle capable of adjusting a temperature of a battery module by using a single chiller where a refrigerant and a coolant are heat-exchanged, recollecting waste heat of the electrical component and the battery module and using the same for heating of the vehicle, and forming a plurality of coolant flowing lines by a single valve according to a selected mode of the vehicle.

Embodiments of the present disclosure provide a heat pump system for a vehicle capable of enhancing the overall efficiency of the system by adjusting a temperature of a battery module by using a single chiller where a refrigerant and a coolant are heat-exchanged and by selectively recollecting waste heat of the electrical component and the battery module and using the same for heating of the vehicle interior.

In addition, embodiments of the present disclosure provide a heat pump system for a vehicle capable of simplifying a layout of the system and reducing manufacturing costs by forming a plurality of coolant flowing lines by a single valve according to a selected mode of the vehicle.

A heat pump system for a vehicle includes a valve module configured to control flow of a coolant that is interiorly introduced, according to at least one mode for temperature adjustment of a vehicle interior and temperature adjustment of a battery module, a first line connected to the valve module to selectively flow the coolant and provided with an electrical component, a second line of which a first end connected to the first line and a second end may be connected to the valve module to selectively flow the coolant, and on which a radiator is provided, a third line connected to the valve module to selectively flow the coolant and provided with the battery module, a fourth line of which a first end may be connected to the valve module to selectively flow the coolant and a second end may be connected to the third line, a fifth line of which a first end may be connected to the valve module to selectively flow the coolant, and on which a chiller is provided, a sixth line of which a first end may be connected to the first line and a second end may be connected to the fifth line, and through which the coolant selectively flows, and a seventh line of which a first end may be connected to the third line and a second end may be connected to the fifth line, and through which the coolant selectively flows.

The valve module may include a valve configured to control the flow of the interiorly introduced coolant and at least one water pump provided in the valve.

The at least one water pump may include a first water pump mounted on the valve corresponding to the first line and a second water pump mounted on the valve corresponding to the third line.

The first water pump and the second water pump may be disposed at positions facing each other with reference to the valve.

The valve may selectively discharge the coolant selectively introduced from the second line, the fourth line, or the fifth line through the first line or the third line depending on selection of the at least one mode.

The at least one mode may include a first mode for cooling the electrical component and the battery module by using the coolant cooled at the radiator, a second mode for heating the vehicle interior and recollecting waste heat of the battery module, and a third mode for heating the vehicle interior and recollecting waste heat of the electrical component.

In the first mode, the second line may be connected to the third line by an operation of the valve module such that the coolant cooled at the radiator may be supplied to the electrical component and the battery module, the fourth line may be connected to the first line by the operation of the valve module, the first line, the second line, the third line, and the fourth line may be interconnected by the operation of the valve module such that the coolant may circulate along the first line, the second line, the third line, and the fourth line, the fifth line may be closed by the operation of the valve module, and the sixth line and the seventh line may be closed by the closed fifth line.

In the second mode, the second line may be connected to the first line by an operation of the valve module such that the coolant cooled at the radiator may be supplied to the electrical component, the fifth line may be connected to the third line by the operation of the valve module, the seventh line may be opened to be connected to the third line and the fifth line, the fourth line and the sixth line may be closed by the operation of the valve module, the first line and the second line may form an independent closed circuit by the operation of the valve module, the third line, the fifth line, and the seventh line may form an independent closed circuit by the operation of the valve module, and the chiller may be configured to recollect the waste heat of the battery module from the coolant heated by cooling the battery module.

In the third mode, the second line may be closed by an operation of the valve module such that the coolant having passed through the electrical component is not supplied to the radiator, the fifth line may be connected to the first line by the operation of the valve module, the sixth line may be opened to be connected to the first line and the fifth line, the fourth line may be connected to the third line by the operation of the valve module, the seventh line may be closed by the operation of the valve module, the first line, the fifth line, and the sixth line may form an independent closed circuit by the operation of the valve module, the third line and the fourth line may form an independent closed circuit by the operation of the valve module, and the chiller may be configured to recollect the waste heat of the electrical component from the coolant heated by cooling the electrical component.

In the third mode, the battery module may be selectively heated.

The valve module may further include a reservoir tank provided in the valve and connected to the second line.

The chiller may be connected to an air conditioner unit through a refrigerant connection line.

The chiller may be a water-cooled heat-exchanger that heat-exchanges the interiorly introduced coolant with a refrigerant supplied from the air conditioner unit.

A coolant heater may be provided in the third line.

For increasing a temperature of the battery module, the coolant heater may be operated such that the coolant supplied to the battery module along the third line is heated.

The fourth line and the seventh line may be connected to the third line through the coolant heater.

According to a heat pump system for a vehicle according to an embodiment, the overall efficiency of the system may be enhanced by adjusting a temperature of a battery module by using a single chiller where a refrigerant and a coolant are heat-exchanged and by selectively recollecting waste heat of the electrical component and the battery module and using the same for heating of the vehicle.

In addition, according to embodiments of the present disclosure, streamlining and simplification of the system may be achieved while reducing manufacturing costs by forming a plurality of coolant flowing lines by a single valve according to a selected mode of the vehicle.

In addition, according to an embodiment, by efficiently adjusting the temperature of the battery module, the optimal performance of the battery module may be enabled, and the overall travel distance of the vehicle may be increased due to the efficient management of the battery module.

In addition, according to an embodiment, it is possible to reduce the manufacturing cost and weight through simplification of an entire system and to improve space utilization.

DETAILED DESCRIPTION OF ILLUSTRATIVE EMBODIMENTS

Figure 1:
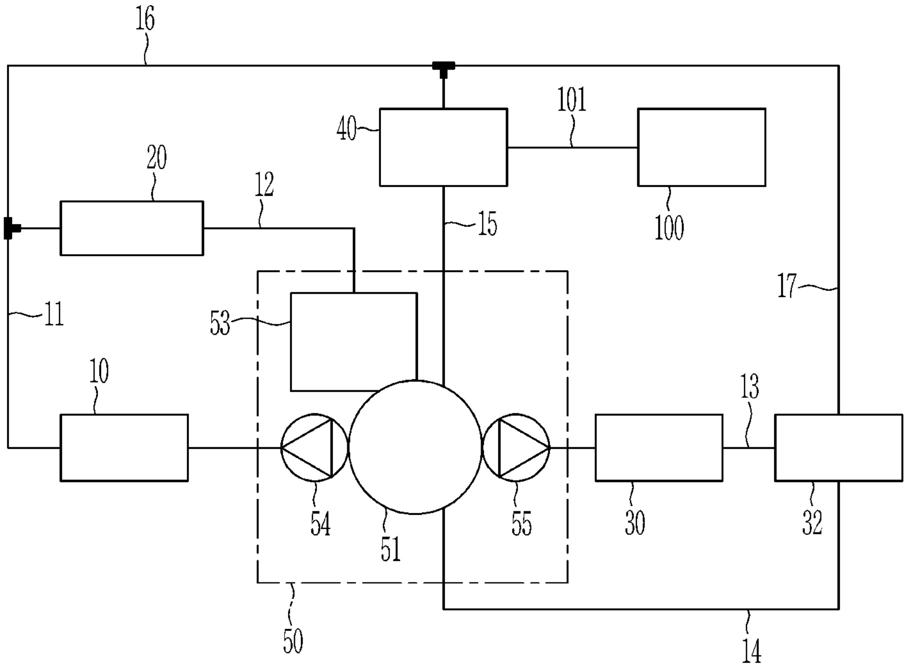
FIG. 1 is a block diagram of a heat pump system of a vehicle according to an embodiment.

Embodiments of the present invention will hereinafter be described in detail with reference to the accompanying drawings.

Exemplary embodiments disclosed in the present specification and the constructions depicted in the drawings are only the preferred embodiments of the present disclosure and do not cover the entire scope of the present disclosure.

Therefore, it will be understood that there may be various equivalents and variations included within the scope of the present disclosure.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but embodiments of the present disclosure are not necessarily limited thereto, and in the drawings, the thickness of layers, films, panels, regions, etc. are exaggerated for clarity.

In addition, unless explicitly described to the contrary, the word “comprise” and variations such as “comprises” or “comprising” will be understood to imply the inclusion of stated elements but not the exclusion of any other elements.

Furthermore, each of terms, such as “ . . . unit”, “ . . . means”, “ . . . portions,” “ . . . part,” and “ . . . member” described in the specification, mean a unit of a comprehensive element that performs at least one function or operation.

FIG. 1 is a block diagram of a heat pump system of a vehicle according to an embodiment.

A heat pump system for a vehicle according to an embodiment may efficiently adjust the temperature of a battery module 30 by using a single chiller 40 where a refrigerant and a coolant are heat-exchanged and may selectively recollect waste heat of an electrical component 10 and the battery module 30 and use the same for heating of the vehicle interior, thereby enhancing the overall efficiency of the system.

In addition, according to the heat pump system, the layout of the system may be simplified and the manufacturing costs may be reduced by forming a plurality of coolant lines by a single valve 51 according to a selected mode of the vehicle.

Here, according to the heat pump system, in an electric vehicle, the electrical component 10 and the battery module 30 through which the coolant circulates may be interconnected with each other through an air conditioner unit 100 and the chiller 40 for circulating the refrigerant for cooling and heating of the vehicle interior.

That is, referring to FIG. 1, the heat pump system may include a first line 11, a second line 12, a third line 13, a fourth line 14, a fifth line 15, a sixth line 16, a seventh line 17, and a valve module 50.

First, the valve module 50 may control flow of the coolant that is interiorly introduced, according to at least one selected mode for temperature adjustment of the vehicle interior and temperature adjustment of the battery module 30.

A configuration of the valve module 50 will be described in more detail below.

In the present embodiment, a first end of the first line 11 may be connected to the valve module 50, and the coolant may selectively flow therethrough. The electrical component 10 may be provided on the first line 11.

A first end of the second line 12 may be connected to a second end of the first line 11. A second end of the second line 12 may be connected to the valve module 50, and the coolant may selectively flow therethrough.

A radiator 20 may be provided in the second line 12. The radiator 20 may be disposed in the front of the vehicle, and a cooling fan (not shown) may be provided at a downstream side of the radiator 20. Accordingly, the radiator 20 cools the coolant through an operation of the cooling fan and heat-exchange with an ambient air.

In the present embodiment, a first end of the third line 13 may be connected to the valve module 50 to selectively flow the coolant. The battery module 30 may be provided on the third line 13.

Here, a coolant heater 32 may be provided in the third line 13. For increasing a temperature of the battery module 30, the coolant heater 32 may be operated to heat the coolant supplied to the battery module 30 along the third line 13.

The coolant heater 32 may be an electrical heater operated by supply of power.

That is, the coolant heater 32 may be operated when the temperature of the coolant supplied to the battery module 30 is lower than a target temperature to heat the coolant flowing through the third line 13.

Accordingly, the coolant heated while passing through the coolant heater 32 is supplied to the battery module 30 along the third line 13 by an operation of the valve module 50 and may increase the temperature of the battery module 30.

Therefore, the coolant heater 32 may be selectively operated to increase the temperature of the battery module 30.

A first end of the fourth line 14 may be connected to the valve module 50 to selectively flow the coolant. A second end of the fourth line 14 may be connected to a second end of the third line 13.

In the present embodiment, a first end of the fifth line 15 may be connected to the valve module 50 to selectively flow the coolant. The chiller 40 may be provided in the fifth line 15.

Here, the chiller 40 may be connected to the air conditioner unit 100 through a refrigerant connection line 101. The chiller 40 may be a water-cooled heat-exchanger that heat-exchanges the interiorly introduced coolant with respect to the refrigerant supplied from the air conditioner unit 100.

That is, the chiller 40 may adjust a temperature of the coolant by heat-exchanging the selectively supplied coolant with the refrigerant selectively supplied from the air conditioner unit 100.

Here, for cooling of the battery module 30, or for heating of the vehicle interior, the chiller 40 may be operated in order to recollect waste heat from the coolant heated by waste heat of the electrical component 10 or waste heat of the battery module 30.

In the present embodiment, a first end of the sixth line 16 may be connected to the second end of the first line 11. A second end of the sixth line 16 may be connected to a second end of the fifth line 15.

The coolant may selectively flow along the sixth line 16 according to the operation of the valve module 50.

In addition, a first end of the seventh line 17 may be connected to the second end of the third line 13. A second end of the seventh line 17 may be connected to the second end of the fifth line 15.

The coolant may selectively flow along the seventh line 17 according to the operation of the valve module 50.

Here, the fourth line 14 and the seventh line 17 may be connected to the third line 13 through the coolant heater 32.

Meanwhile, in the present embodiment, the valve module 50 may include the valve 51 for controlling the flow of the interiorly introduced coolant and at least one water pump provided in the valve 51.

The valve module 50 may be provided with the valve 51 and may further include a reservoir tank 53 connected to the second line 12.

Here, the at least one water pump may include first and second water pumps 54 and 55.

First, the first water pump 54 may be mounted on the valve 51 corresponding to the first line 11.

In addition, the second water pump 55 may be mounted on the valve 51 corresponding to the third line 13.

Here, the first water pump 54 and the second water pump 55 may be disposed at positions facing each other with reference to the valve 51.

In the present embodiment, the valve 51 may selectively discharge the coolant selectively introduced from the second line 12, the fourth line 14, or the fifth line 15 through the first line 11 or the third line 13 depending on the selection of the at least one mode.

Here, the at least one mode may include a first mode to a third mode.

First, in the first mode, the electrical component 10 and the battery module 30 may be cooled by using the coolant cooled at the radiator 20.

In the second mode, the vehicle interior may be heated, and the waste heat of the battery module 30 may be recollected.

In addition, in the third mode, the vehicle interior may be heated, and the waste heat of the electrical component 10 may be recollected.

Hereinafter, operation and action in each mode of a heat pump system of a vehicle according to an embodiment configured as described above is described in detail with reference to FIG. 2 to FIG. 4.

First, an operation in the first mode of a heat pump system for a vehicle according to an embodiment for cooling the electrical component 10 and the battery module 30 by using the coolant cooled at the radiator 20 is described with reference to FIG. 2.

Figure 2:
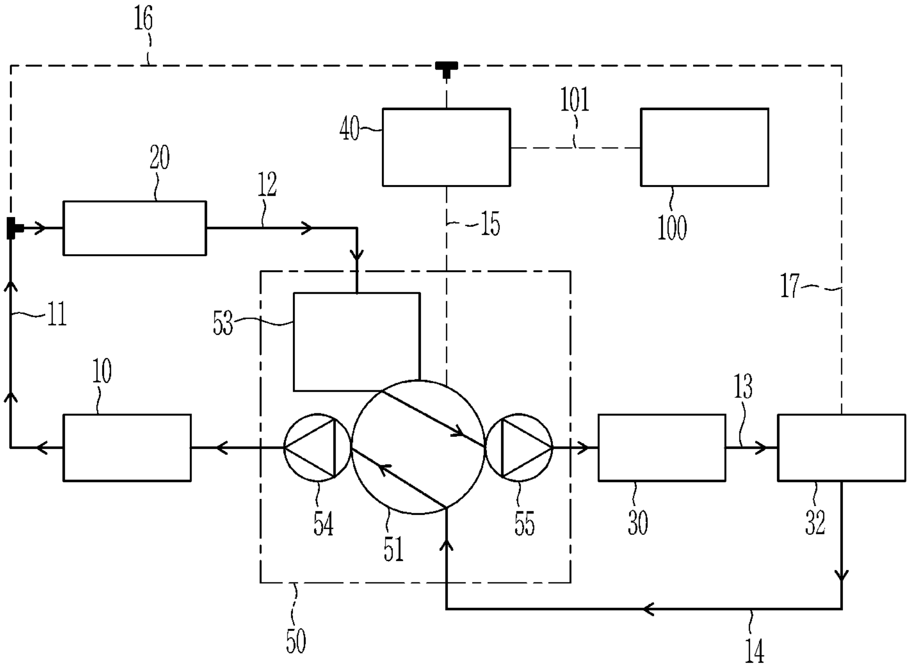
FIG. 2 is an operation diagram of a first mode of a heat pump system of a vehicle according to an embodiment.

FIG. 2 is an operation diagram of a first mode of a heat pump system of a vehicle according to an embodiment.

Referring to FIG. 2, in the first mode, the second line 12 may be connected to the third line 13 by an operation of the valve 51 such that the coolant cooled at the radiator 20 may be supplied to the electrical component 10 and the battery module 30.

The fourth line 14 may be connected to the first line 11 by the operation of the valve 51.

Meanwhile, the fifth line 15 may be closed by the operation of the valve 51. At the same time, the sixth line 16 and the seventh line 17 may be closed by the closed fifth line 15.

Accordingly, the first line 11, the second line 12, the third line 13, and the fourth line 14 may be interconnected by the operation of the valve 51 such that the coolant may circulate along the first line 11, the second line 12, the third line 13, and the fourth line 14.

In such a state, when the first water pump 54 and the second water pump 55 are both operated, the coolant cooled at the radiator 20 flows into the valve 51 along the second line 12, and then is discharged through the third line 13.

The coolant discharged to the third line 13 may cool the battery module 30 while passing through the battery module 30. The coolant having cooled the battery module 30 flows back to the valve 51 along the fourth line 14.

The coolant introduced into the valve 51 through the fourth line 14 is discharged through the first line 11.

The coolant discharged to the first line 11 may cool the electrical component 10 while passing through the electrical component 10. The coolant having cooled the electrical component 10 flows into the radiator 20 along the second line 12.

The coolant introduced into the radiator 20 may be cooled through heat-exchange with the ambient air.

Meanwhile, the air conditioner unit 100 may stop operating.

That is, by repeatedly performing the above-described processes, the coolant cooled at the radiator 20 may cool the electrical component 10 and the battery module 30 to prevent overheating.

Here, the coolant cooled at the radiator 20 may more efficiently cool the battery module 30 by first passing through the battery module 30 by the operation of the valve module 50.

In the present embodiment, an operation in the second mode for heating the vehicle interior and for recollecting the waste heat of the battery module 30 is described with reference to FIG. 3.

Figure 3:
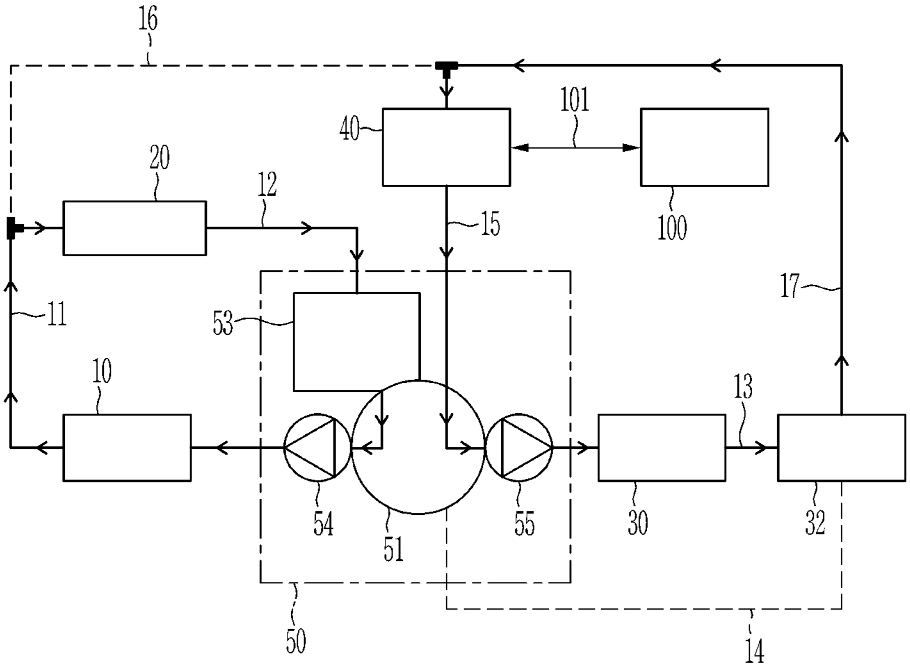
FIG. 3 is an operation diagram of a second mode of a heat pump system of a vehicle according to an embodiment.

FIG. 3 is an operation diagram of the second mode of a heat pump system of a vehicle according to an embodiment.

Referring to FIG. 3, in the second mode, the second line 12 may be connected to the first line 11 by the operation of the valve 51 such that the coolant cooled at the radiator 20 may be supplied to the electrical component 10.

The fifth line 15 may be connected to the third line 13 by the operation of the valve 51.

The seventh line 17 may be opened to be connected to the third line 13 and the fifth line 15 that are interconnected. The fourth line 14 and the sixth line 16 may be closed by the operation of the valve 51.

Accordingly, the first line 11 and the second line 12 may form an independent closed circuit by the operation of the valve module 50.

In addition, the third line 13, the fifth line 15, and the seventh line 17 may form an independent closed circuit by the operation of the valve module 50.

In such a state, when the first water pump 54 is operated, the coolant cooled at the radiator 20 flows into the valve 51 along the second line 12 and then is discharged through the first line 11.

The coolant discharged to the first line 11 may cool the electrical component 10 while passing through the electrical component 10. The coolant having cooled the electrical component 10 flows into the radiator 20 along the second line 12.

Meanwhile, when the second water pump 55 is operated, the coolant discharged to the third line 13 may cool the battery module 30 while passing through the battery module 30.

The coolant having cooled the battery module 30 may flow along the opened seventh line 17. The coolant flowing through the seventh line 17 may pass through the chiller 40 along the opened fifth line 15.

Here, the air conditioner unit 100 may operate such that the refrigerant may be supplied to the chiller 40 through the refrigerant connection line 101.

Then, the chiller 40 may recollect the waste heat of the battery module 30 from the coolant heated by cooling the battery module 30.

In more detail, the coolant heated by absorbing the waste heat of the battery module 30 is recollected while heating the refrigerant supplied to the chiller 40 while passing through the chiller 40.

That is, the chiller 40 may heat the refrigerant by heat-exchanging the coolant and the refrigerant in order to recollect waste heat from the coolant heated while passing through the battery module 30. The heated refrigerant may be supplied to the air conditioner unit 100.

As such, by repeatedly performing the above-described processes, the coolant cooled at the radiator 20 may efficiently cool the electrical component 10. In addition, the chiller 40 may smoothly recollect the waste heat of the battery module 30.

Therefore, in the second mode, by absorbing the waste heat of the battery module 30 at the chiller 40 and using it for heating the refrigerant, a power consumption of the compressor provided in the air conditioner unit 100 may be decreased, and a heating efficiency thereof may be enhanced.

In addition, an operation in the third mode of the heat pump system for heating the vehicle interior and for recollecting the waste heat of the electrical component 10 is described with reference to FIG. 4.

Figure 4:
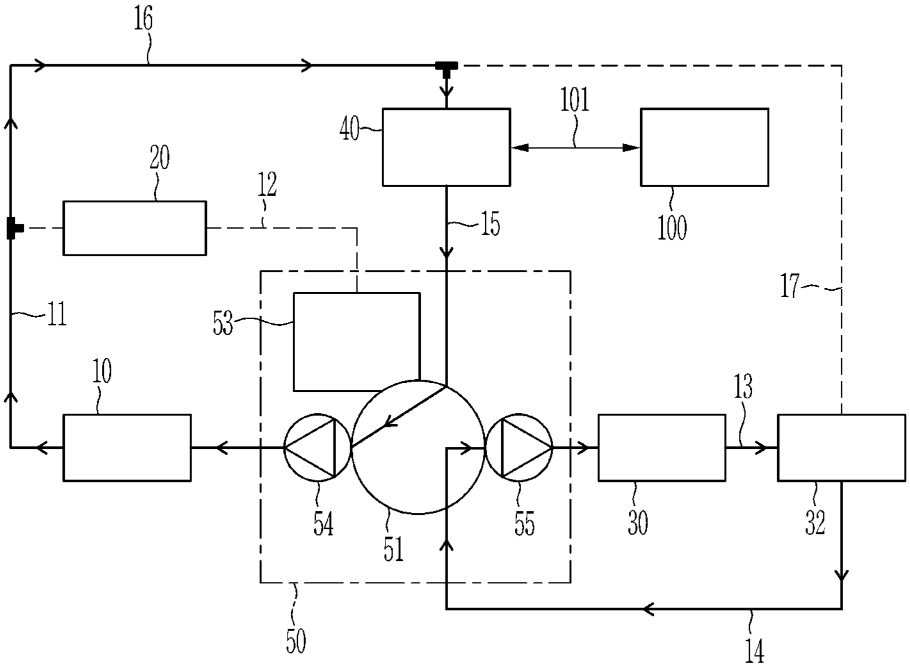
FIG. 4 is an operation diagram of a third mode of a heat pump system of a vehicle according to an embodiment.

FIG. 4 is an operation diagram of the third mode of a heat pump system of a vehicle according to an embodiment.

First, the second line 12 may be closed by the operation of the valve 51 such that the coolant having passed through the electrical component 10 is not supplied to the radiator 20.

The fifth line 15 may be connected to the first line 11 by the operation of the valve 51.

The sixth line 16 may be opened to be connected to the first line 11 and the fifth line 15 that are interconnected.

Meanwhile, the fourth line 14 may be connected to the third line 13 by operation of the valve module 50. At the same time, the seventh line 17 may be closed by the operation of the valve module 50.

Accordingly, the first line 11, the fifth line 15, and the sixth line 16 may form an independent closed circuit by the operation of the valve module 50.

In addition, the third line 13 and the fourth line 14 may form an independent closed circuit by the operation of the valve module 50.

In such a state, when the first water pump 54 is operated, the coolant discharged to the first line 11 may cool the electrical component 10 while passing through the electrical component 10.

The coolant having cooled the electrical component 10 may flow along the opened sixth line 16. The coolant flowing through the sixth line 16 may pass through the chiller 40 along the opened fifth line 15.

Here, the air conditioner unit 100 may operate such that the refrigerant may be supplied to the chiller 40 through the refrigerant connection line 101.

Then, the chiller 40 may recollect the waste heat of the electrical component 10 from the coolant heated by cooling the electrical component 10.

In more detail, the coolant heated by absorbing the waste heat of the electrical component 10 is recollected while heating the refrigerant supplied to the chiller 40 while passing through the chiller 40.

That is, the chiller 40 may heat-exchange the coolant and the refrigerant to heat the refrigerant in order to recollect waste heat from the coolant heated while passing through the electrical component 10. The heated refrigerant may be supplied to the air conditioner unit 100.

Meanwhile, when the second water pump 55 is operated, the coolant discharged to the third line 13 may be circulated along the third line 13 and the fourth line 14.

Here, when the battery module 30 needs to be heated, the coolant heater 32 may be operated.

The coolant heater 32 may efficiently increase the temperature of the battery module 30 by heating the coolant circulating along the third line 13 and the fourth line 14 by the operation of the valve module 50.

As such, by repeatedly performing the above-described processes, the chiller 40 may smoothly recollect the waste heat of the electrical component 10 from the coolant heated by cooling the electrical component 10.

That is, in the third mode, by absorbing the waste heat of the electrical component 10 and using it for heating the refrigerant, a power consumption of the compressor provided in the air conditioner unit 100 may be decreased, and a heating efficiency thereof may be enhanced.

In addition, in the third mode, for increasing the temperature of the battery module 30, the temperature of the battery module 30 may be efficiently adjusted by selectively operating the coolant heater 32 provided on the third line 13.

Therefore, according to a heat pump system for a vehicle according to an embodiment, the overall efficiency of the system may be enhanced by adjusting the temperature of the battery module 30 by using a single chiller 40 where a refrigerant and a coolant are heat-exchanged and by selectively recollecting the waste heat of the electrical component 10 and the battery module 30 and using the same for heating of the vehicle.

In addition, according to embodiments of the present disclosure, by forming a plurality of coolant flowing lines by a single valve 51 according to the selected mode of the vehicle, streamlining and simplification of the system may be achieved while reducing manufacturing costs.

In addition, according to an embodiment, by efficiently adjusting the temperature of the battery module 30, the optimal performance of the battery module 30 may be enabled, and the overall travel distance of the vehicle may be increased due to the efficient management of the battery module 30.

In addition, according to an embodiment, it is possible to reduce the manufacturing cost and weight through simplification of an entire system and to improve space utilization.

While embodiments of this invention have been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A heat pump system for a vehicle, the system comprising:

a valve module configured to control a flow of a coolant, according to a mode selected from a plurality of modes for temperature adjustment of a vehicle interior and temperature adjustment of a battery module;

a first line connected to the valve module to selectively flow the coolant;

an electrical component on the first line;

a second line comprising a first end connected to the first line and a second end connected to the valve module to selectively flow the coolant;

a radiator on the second line;

a third line connected to the valve module to selectively flow the coolant, wherein the battery module is on the third line;

a fourth line comprising a first end connected to the valve module to selectively flow the coolant and a second end connected to the third line;

a fifth line comprising a first end connected to the valve module to selectively flow the coolant;

a chiller on the fifth line;

a sixth line comprising a first end connected to the first line and a second end connected to the fifth line to selectively flow the coolant; and a seventh line comprising a first end connected to the third line and a second end connected to the fifth line to selectively flow the coolant.

2. The system of claim 1, wherein the valve module comprises:

a valve configured to control the flow of the coolant; and a water pump.

3. The system of claim 1, wherein the valve module comprises:

a valve configured to control the flow of the coolant;

a first water pump mounted on the valve corresponding to the first line; and a second water pump mounted on the valve corresponding to the third line.

4. The system of claim 3, wherein the first water pump and the second water pump are disposed at positions facing each other with reference to the valve.

5. The system of claim 3, wherein the valve is configured to selectively discharge the coolant selectively introduced from the second line, the fourth line, or the fifth line through the first line or the third line depending on the mode.

6. The system of claim 3, wherein the valve module further comprises a reservoir tank connected to the second line.

7. The system of claim 1, wherein the chiller is connected to an air conditioner unit through a refrigerant connection line.

8. The system of claim 7, wherein the chiller comprises a water-cooled heat-exchanger configured to heat-exchange the coolant with a refrigerant supplied from the air conditioner unit.

9. A heat pump system for a vehicle, the system comprising:

a valve module configured to control a flow of a coolant according to a mode selected from a plurality of modes for temperature adjustment of a vehicle interior and temperature adjustment of a battery module, the plurality of modes comprising:

a first mode for cooling an electrical component and the battery module by using the coolant cooled at a radiator;

a second mode for heating the vehicle interior and recollecting waste heat of the battery module; and a third mode for heating the vehicle interior and recollecting waste heat of the electrical component;

a first line connected to the valve module to selectively flow the coolant, wherein the electrical component is on the first line;

a second line comprising a first end connected to the first line and a second end connected to the valve module to selectively flow the coolant, wherein the radiator is on the second line;

a third line connected to the valve module to selectively flow the coolant, wherein the battery module is on the third line;

a fourth line comprising a first end connected to the valve module to selectively flow the coolant and a second end connected to the third line;

a fifth line comprising a first end connected to the valve module to selectively flow the coolant;

a chiller on the fifth line;

a sixth line comprising a first end connected to the first line and a second end connected to the fifth line to selectively flow the coolant; and a seventh line comprising a first end connected to the third line and a second end connected to the fifth line to selectively flow the coolant.

10. The system of claim 9, wherein, in the first mode:

the second line is connected to the third line by an operation of the valve module such that the coolant cooled at the radiator is supplied to the electrical component and the battery module;

the fourth line is connected to the first line by the operation of the valve module;

the first line, the second line, the third line, and the fourth line are interconnected by the operation of the valve module such that the coolant may circulate along the first line, the second line, the third line, and the fourth line;

the fifth line is closed by the operation of the valve module; and the sixth line and the seventh line are closed by the closed fifth line.

11. The system of claim 9, wherein, in the second mode:

the second line is connected to the first line by an operation of the valve module such that the coolant cooled at the radiator is supplied to the electrical component;

the fifth line is connected to the third line by the operation of the valve module;

the seventh line is opened to be connected to the third line and the fifth line;

the fourth line and the sixth line are closed by the operation of the valve module;

the first line and the second line define an independent closed circuit by the operation of the valve module;

the third line, the fifth line, and the seventh line define an independent closed circuit by the operation of the valve module; and the chiller is configured to recollect the waste heat of the battery module from the coolant heated by cooling the battery module.

12. The system of claim 9, wherein, in the third mode:

the second line is closed by an operation of the valve module such that the coolant having passed through the electrical component is not supplied to the radiator;

the fifth line is connected to the first line by the operation of the valve module;

the sixth line is opened to be connected to the first line and the fifth line;

the fourth line is connected to the third line by the operation of the valve module;

the seventh line is closed by the operation of the valve module;

the first line, the fifth line, and the sixth line define an independent closed circuit by the operation of the valve module;

the third line and the fourth line define an independent closed circuit by the operation of the valve module; and the chiller is configured to recollect the waste heat of the electrical component from the coolant heated by cooling the electrical component.

13. The system of claim 9, wherein, in the third mode, the battery module is selectively heated.

14. The system of claim 9, wherein the chiller is connected to an air conditioner unit through a refrigerant connection line.

15. The system of claim 14, wherein the chiller comprises a water-cooled heat-exchanger configured to heat-exchange the coolant with a refrigerant supplied from the air conditioner unit.

16. A heat pump system for a vehicle, the system comprising:

a valve module configured to control a flow of a coolant according to a mode selected from a plurality of modes for temperature adjustment of a vehicle interior and temperature adjustment of a battery module;

a first line connected to the valve module to selectively flow the coolant;

an electrical component on the first line;

a second line comprising a first end connected to the first line and a second end connected to the valve module to selectively flow the coolant;

a radiator on the second line;

a third line connected to the valve module to selectively flow the coolant, wherein the battery module is on the third line;

a coolant heater on the third line;

a fourth line comprising a first end connected to the valve module to selectively flow the coolant and a second end connected to the third line;

a fifth line comprising a first end connected to the valve module to selectively flow the coolant;

a chiller on the fifth line;

a sixth line comprising a first end connected to the first line and a second end connected to the fifth line to selectively flow the coolant; and a seventh line comprising a first end connected to the coolant heater and a second end connected to the fifth line to selectively flow the coolant.

17. The system of claim 16, wherein, in order to increase a temperature of the battery module, the coolant heater is configured to be operated such that the coolant supplied to the battery module along the third line is heated.

18. The system of claim 16, wherein the fourth line and the seventh line are connected to the third line through the coolant heater.

19. The system of claim 16, wherein the chiller is connected to an air conditioner unit through a refrigerant connection line.

20. The system of claim 19, wherein the chiller comprises a water-cooled heat-exchanger configured to heat-exchange the coolant with a refrigerant supplied from the air conditioner unit.

* * * * *